United States Patent Office 2,966,501
Patented Dec. 27, 1960

2,966,501

4-HALO DERIVATIVES OF 2-HYDROXYMETHYL-ENE Δ⁴-ANDROSTEN-17β-OL-3-ONE AND THE CORRESPONDING 19-NOR COMPOUNDS

Howard J. Ringold and George Rosenkranz, Mexico City, Mexico, assignors to Syntex S.A., Mexico City, Mexico, a corporation of Mexico No Drawing. Filed Nov. 14, 1958, Ser. No. 773,829

Claims priority, application Mexico Nov. 18, 1957

17 Claims. (Cl. 260—397.4)

The present invention relates to novel cyclopentanophenanthrene compounds.

More particularly the present invention relates to novel androgenic type hormones having especially desirable anabolic properties that are 4-chloro or 4-bromo derivatives of 2-hydroxymethylene-Δ⁴-androsten-17β-ol-3-one compounds as well as the corresponding 19-nor compounds hereinafter set forth in detail.

The novel compounds and androgenic type hormones having anabolic properties of the present invention are illustrated by the following structural formula:

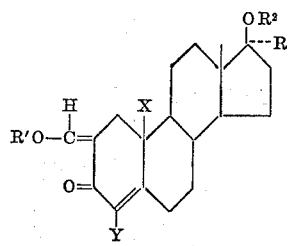

In the above formula R represents hydrogen or a lower alkyl group such as methyl, ethyl or propyl or a lower alkenyl group such as vinyl. $R^1$ represents hydrogen, a lower alkyl or benzyl group such as methyl, ethyl, propyl or benzyl, or a hydrocarbon carboxylic acyl group of less than 12 carbon atoms. The acyl group may be saturated or unsaturated, straight or branched chain aliphatic, cyclic or mixed cyclic-aliphatic and may be conventionally substituted with halogen or methoxy for example. Typical acyl group are acetate, propionate, butyrate, hemisuccinate, enanthate, caproate, benzoate, trimethylacetate, acetoxypropionate, cyclopentylpropionate, phenylpropionate or β-chloropropionate. $R^2$ represents hydrogen when R is alkyl or alkylene and $R^2$ represents hydrogen or a hydrocarbon carboxylic acyl group of less than 12 carbon atoms when R is hydrogen. X represents $CH_3$ or hydrogen. Y represents chlorine or bromine.

The compounds above set forth are prepared by a process outlined in the following equation:

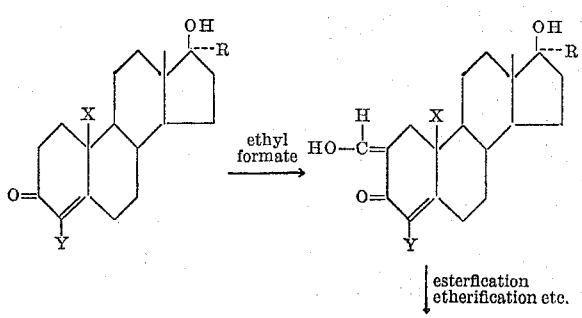

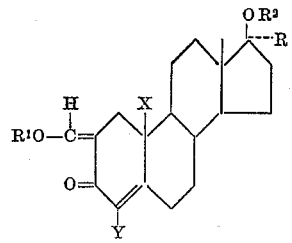

In the above equation R, $R^1$, $R^2$, X and Y represent the same groups as heretofore set forth.

In practicing the process above set forth 4-bromo or 4-chloro-testosterone, 17α-lower alkyl or lower alkenyl testosterone or the same 19-nor compounds are reacted with ethyl formate in the presence of sodium hydride to prepare the corresponding 2-hydroxymethylene derivatives. These compounds wherein R is hydrogen, when esterified with an acid chloride in aqueous alkaline solution (Schotten-Baumann Reaction) were selectively esterified to give the corresponding 2-acyloxymethylene compounds. Where the 17-hydroxy group is tertiary (R is alkyl or alkenyl) the 2-acyloxymethylene compounds were obtained by conventional esterification with an acid anhydride in pyridine. The secondary hydroxyl group at C–17 was also further conventionally esterified to give 2-acyloxymethylene 17-esters wherein the ester groups were different. The diesters of the compounds with a secondary C–17 hydroxy having the same ester groups were prepared by conventional esterification with an excess of an acid anhydride. The ethers of the hydroxymethylene group were formed by reaction of the compounds with a lower alkyl iodide or benzyl iodide and 17-esters of these ether compounds were formed by conventionally esterifying the ether compounds.

The following specific examples serve to illustrate but are not intended to limit the present invention.

*Example I*

A suspension of 10 g. of 4-chloro-testosterone in 500 cc. of thiophene free anhydrous benzene was treated with 10 cc. of ethyl formate and 3 g. of sodium hydride and the mixture was stirred under nitrogen for 5 hours at a temperature around 25° C. The precipitate consisting of a mixture of the sodium salt of the 2-hydroxymethylene compound and the excess of sodium hydride was collected by filtration, washed with benzene and dried. This mixture was slowly added to a solution of 20 cc. of concentrated hydrochloric acid and 500 cc. of water, under vigorous stirring; the stirring was continued for 30 minutes and the precipitate was collected, abundantly washed with distilled water, dried under vacuum and recrystalized from acetone-hexane. There was thus obtained 2-hydroxymethylene-4-chlorotestosterone.

*Example II*

By the method described in the previous example, 4-chloro-19-nor-testosterone was converted into 2-hydroxymethylene-4-chloro-19-nor-testosterone; from the 17α-lower alkyl (methyl, ethyl and propyl)-4-chloro-derivatives of testosterone and of 19-nor-testosterone, as well as from the 17α-alkenyl (vinyl)-derivatives, there were obtained the corresponding 2-hydroxymethylene compounds.

*Example III*

By applying the methods of the previous examples to the 4-bromo-derivatives instead of the 4-chloro-derivatives, there were obtained the corresponding 2-hydroxymethylene derivatives brominated at C-4.

Example IV

A solution of 1 g. of 2 hydroxymethylene-4-chloro-testosterone in 20 cc. of water containing 600 mg. of sodium hydroxide was treated dropwise and under stirring with benzoyl chloride until the mixture had a weakly acidic reaction and while the temperature was maintained at 10° C. The product was extracted with ether, washed with water to neutral, dried over anhydrous sodium sulfate, filtered and evaporated to dryness. Crystallization of the residue from acetone-hexane furnished 2-benzoxymethylene-4-chloro-testosterone.

Example V

A mixture of 1 g. of 2-hydroxymethylene-17α-methyl-4-chloro-testosterone, 10 cc. of pyridine and 1 cc. of propionic anhydride was kept over night at room temperature and then poured into water and heated on the steam bath for half an hour. After cooling, the precipitate was collected, washed with water and dried. Recrystallization from acetone-hexane produced 2-propoxymethylene-17α-methyl-4-chloro-testosterone.

Example VI

By substituting in the method of the previous example the propionic anhydride for 1.1 molar equivalents of propionyl chloride, there was obtained the same compound.

Example VII

A solution of 1 g. of 2-hydroxymethylene-4-chloro-19-nortestosterone in 10 cc. of pyridine was treated with 1 cc. of propionic anhydride, in accordance with the method of Example V. After working up the product as described in Example V, there was obtained the dipropionate of 2 - hydroxymethylene - 4 - chloro-19-nor-testosterone, namely the 17-propionate of 2-propionoxymethylene-4-chloro-19-nor-testosterone.

Example VIII

A mixture of 1 g. of 2-benzoxymethylene-4-chloro-testosterone, 10 cc. of pyridine and 1 cc. of acetic anhydride was kept overnight at room temperature, poured into water, heated on the steam bath for half an hour and cooled. The precipitate was filtered, washed with water, dried and recrystallized from acetonehexane, thus yielding 2 - benzoxymethylene - 4 - chloro-testosterone 17-acetate.

Example IX

To a solution of 1 g. of 2 - hydroxymethylene - 17α-propyl - 4 - chloro-testosterone in 50 cc. of anhydrous acetone there was added 5 cc. of methyl iodide and 1 g. of anhydrous potassium carbonate and the mixture was refluxed for 48 hours and then poured into water. The product was extracted with ether and the extract was washed with water, dried over anhydrous sodium sulfate, filtered and evaporated to dryness. Chromatography of the residue on neutral alumina afforded 2-methoxymethylene-17α-propyl-4-chloro-testosterone.

Example X

By the method to that of the previous example there was prepared 2-ethoxymethylene - 4 - chloro-19-nor-testosterone by reaction of 2-hydroxymethylene-4-chloro-19-nor-testosterone with ethyl iodide.

The treatment of the above 2-ethoxymethylene compound with propionic anhydride, in accordance with the procedure described in Example V, gave 2-ethoxymethylene-4-chloro-19-nor-testosterone 17-propionate.

Example XI

By substituting in the procedures of the previous Examples IV to X the respective testosterone derivatives chlorinated at C-4, by their 4-bromo derivatives, there were obtained the corresponding compounds brominated at C-4.

Example XII

In the methods described in the previous examples, there were substituted for the acid anhydrides or chlorides there mentioned, other derivatives of hydrocarbon carboxylic acids of less than 12 carbon atoms, which acid may be saturated or unsaturated, of straight or branched chain, cyclic or mixed cyclic-aliphatic substituted or not with methoxy, halogen or other groups; instead of the alkyl iodides described, we also used methyl iodide and benzyl iodide. There can thus be prepared the corresponding monoesters formed by esterifying the hydroxyl group of the hydroxymethylene moiety of the 2-hydroxymethylene-4-halo-derivatives of testosterone, of 19-nor-testosterone and of the 17α-alkyl analogs and 17α-alkenyl analogs of such compounds; diesters of the 2-hydroxymethylene-4-halo-derivatives of testosterone and 19-nor-testosterone, without substituent at C–17α, formed by esterification of the 17β-hydroxyl groups and the hydroxyl group of the hydroxymethylene moiety, which diesters may be formed with the same or different radicals; furthermore, there was prepared ethers obtained by etherification of the hydroxyl group of the hydroxymethylene moiety of all of the 2-hydroxymethylene-4-halo-testosterones, substituted or not at C–17α, as well as 2-lower alkoxymethylene-4-halo-derivatives and 2-benzyloxymethylene - 4 - halo-derivatives of testosterones and 19-nor-testosterones unsubstituted at C–17α and esterfied at the secondary hydroxyl group at C–17β; the ester groups were specifically the acetate, propionate, butrate, hemisuccinate, enanthate, caproate, benzoate, trimethylacetate, acetoxypropionate, cyclopentylpropionate, phenylpropionate or β-chloropropionate; the ether groups were specifically methyl, ethyl, propyl and benzyl.

We claim:

1. A compound of the following formula:

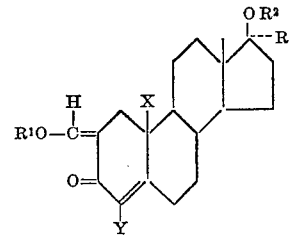

wherein R is selected from the group consisting of hydrogen, lower alkyl and lower alkenyl, $R^1$ is selected from the group consisting of hydrogen, lower alkyl, benzyl, and hydrocarbon carboxylic acyl of less than 12 carbon atoms, $R^2$ is hydrogen when R is other than hydrogen and $R^2$ is selected from the group consisting of hydrogen and hydrocarbon carboxylic acyl of less than 12 carbon atoms when R is hydrogen, X is selected from the group consisting of hydrogen and methyl and Y is selected from the chlorine and bromine.

2. 2-hydroxymethylene-4-chloro - $\Delta^4$-androsten - 17β-ol-3-one.

3. The 17-monoesters of hydrocarbon carboxylic acids of less than 12 carbon atoms of 2-hydroxymethylene - 4-chloro-$\Delta^4$-androsten-17β-ol-3-one.

4. 2-hydroxymethylene - 17α - lower alkyl-4-chloro-$\Delta^4$-androsten-17β-ol-3-one.

5. 2-hydroxymethylene-17α - lower alkenyl-4-chloro-$\Delta^4$-androsten-17β-ol-3-one.

6. 2-hydroxymethylene-4-bromo-$\Delta^4$-androsten-17β-ol-3-one.

7. The 17-monoesters of hydrocarbon carboxylic acids of less than 12 carbon atoms of 2-hydroxymethylene-4-bromo-$\Delta^4$-androsten-17β-ol-3-one.

8. 2-hydroxymethylene-17α-lower alkyl-4-bromo-$\Delta^4$-androsten-17β-ol-3-one.

9. 2-hydroxymethylene-17α-lower alkenyl-4-bromo-$\Delta^4$-androsten-17β-ol-3-one.

10. 2-hydroxymethylene-4-chloro-19-nor-$\Delta^4$-androsten-17$\beta$-ol-3-one.

11. The 17-monoesters of hydrocarbon carboxylic acids of less than 12 carbon atoms of 2-hydroxymethylene-4-chloro-19-nor-$\Delta^4$-androsten-17$\beta$-ol-3-one.

12. 2-hydroxymethylene-17$\alpha$-lower alkyl-4-chloro-19-nor-$\Delta^4$-androsten-17$\beta$-ol-3-one.

13. 2-hydroxymethylene-17$\alpha$-lower alkenyl-4-chloro-19-nor-$\Delta^4$-androsten-17$\beta$-ol-3-one.

14. 2-hydroxymethylene-4-bromo-19-nor-$\Delta^4$-androsten-17$\beta$-ol-3-one.

15. The 17-monoesters of hydrocarbon carboxylic acids of less than 12 carbon atoms of 2-hydroxymethylene-4-bromo-19-nor-$\Delta^4$-androsten-17$\beta$-ol-3-one.

16. 2-hydroxymethylene-17$\alpha$-lower alkyl-4-bromo-19-nor-$\Delta^4$-androsten-17$\beta$-ol-3-one.

17. 2-hydroxymethylene-17$\alpha$-lower alkenyl-4-bromo-19-nor-$\Delta^4$-androsten-17$\beta$-ol-3-one.

References Cited in the file of this patent

Weisenborn et al.: J. Am. Chem. Soc., vol. 76 (Jan. 20, 1954) pages 552–555.

Camerino et al.: J. Am. Chem. Soc., vol. 78 (July 20, 1956) pages 3540 and 3541.